May 2, 1961 J. J. MUNSON 2,982,289
CANE STRIPPER
Filed Feb. 4, 1958 2 Sheets-Sheet 1
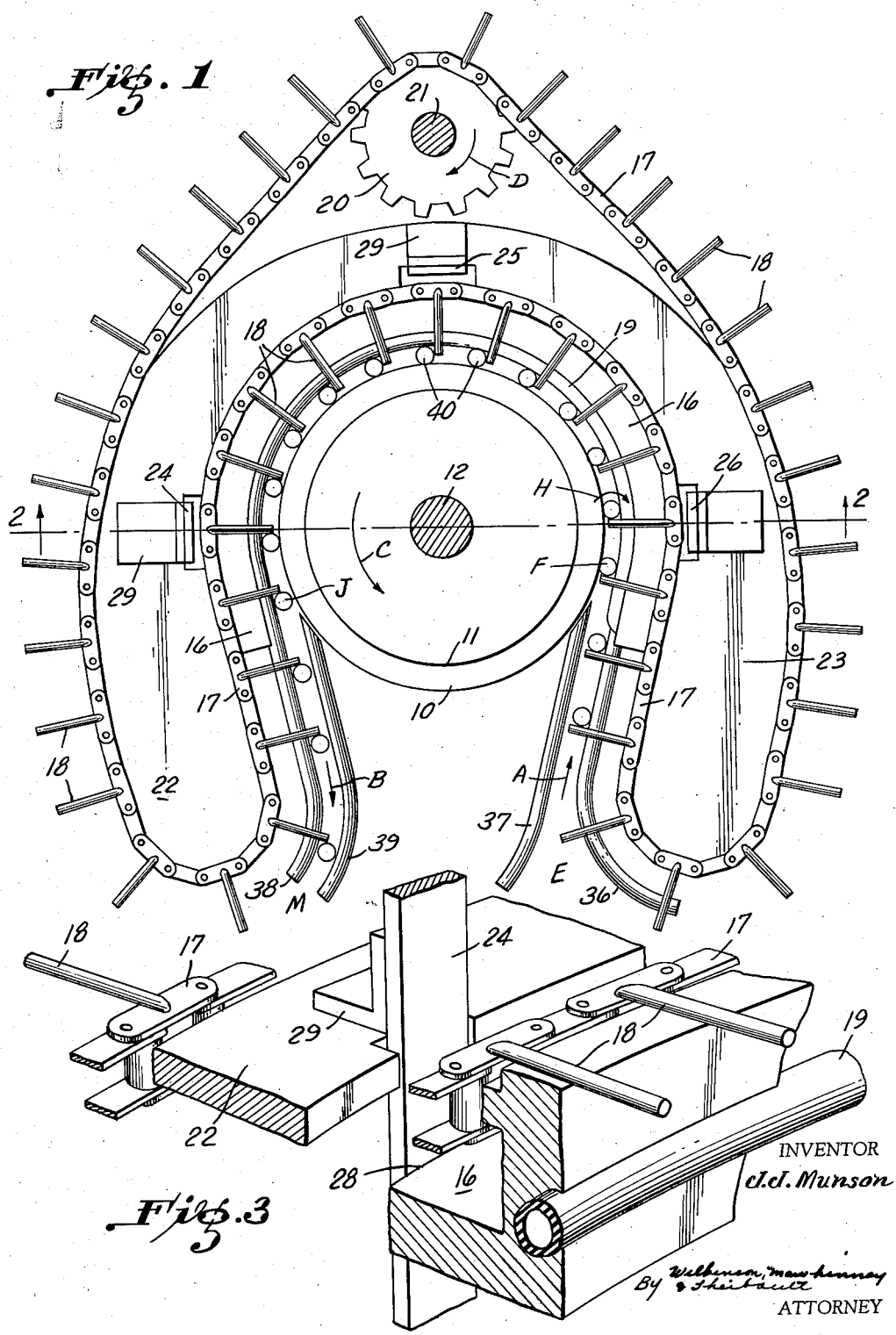

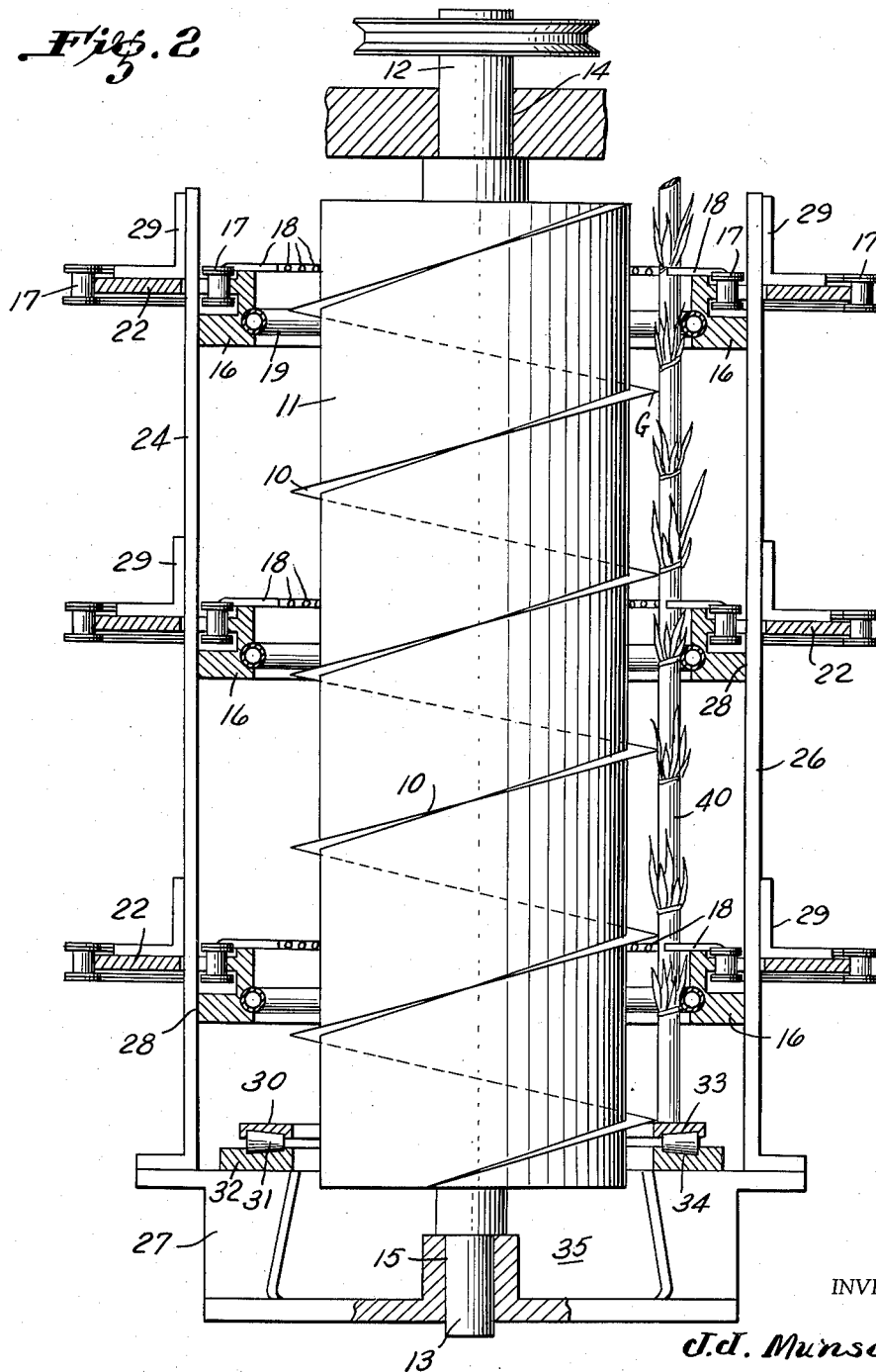

United States Patent Office 2,982,289
Patented May 2, 1961

2,982,289
CANE STRIPPER
Joseph J. Munson, Houma, La.
Filed Feb. 4, 1958, Ser. No. 713,164
3 Claims. (Cl. 130—31)

The present invention relates to machine and process for stripping leaves from sugar cane.

Under current practice in the Louisiana sugar cane belt, harvesters are driven through the rows of standing cane, cutting the stalks at the bottom, also topping the same and then laying the cut stalks across heap rows. The leaves and trash are burned from the stalks in the field, after which the cane is removed to the sugar house for further processing.

The burning of the leaves and trash from the stalks is unsatisfactory, particularly in wet weather, and while there has been for many years a great need for the same, and many proposals have been made, no successful mechanical machine or process has been developed for the mechanical stripping of the leaves and trash from the cane stalks.

As the harvesters now in present operation do a reasonably good job of cutting the cane at the bottom, topping and gathering the stalks, it is the purpose of the present invention to provide a stripping unit so constructed and arranged that it may be installed on conventional harvesters, or alternately it may be embodied in a new type of harvester involving a reconstruction more adaptable to receiving the stripping unit or device.

It is accordingly the primary object of the present invention to provide a process and machine capable of effectively removing all leaves and trash from cane or other stalks without involving any burning operation or any further processing in the field save that of normal harvesting.

A further object of the invention is to provide a machine and process for the stripping of leaves from sugar cane and other stalks which will reduce hand labor, constantly becoming scarcer and more expensive and which will effectively and inexpensively condition the cane stalks for ready acceptance in the sugar house.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view, with parts shown in section of a form of stripping unit constructed in accordance with the present invention.

Figure 2 is a vertical sectional view through the same taken on the line 2—2 of Figure 1.

Figure 3 is a fragmentary isometric view showing a portion of the machine.

Referring more particularly to the drawings, 10 designates a helical knife which may be carried by any suitable support, for instance by a drum 11 preferably arranged with its axis upright and having upper and lower trunnions 12 and 13, respectively, fitted for rotation in upper and lower bearings 14, 15.

Extending about the knife 10 and spaced therefrom are circular or part-circular inner races 16. These races are shown to be three in number in Figure 2, the same being spaced vertically one above another. Endless roller chains 17 travel about the races 16 from which extend in spaced relation numerous flights 18, which project from the chains and overlap the gaps between the drum 11 and inner races 16.

Such inner races 16 carry resilient members 19 which, in the single embodiment of the invention illustrated, are in the form of rubber tubes. Such members 19 possess inherent elasticity for a purpose hereinafter described.

The roller chains 17 run about and are driven by sprockets 20 fast with a shaft 21 which may be driven from any suitable source of power.

The chains also run about outer races 22 and 23 which may be combined integrally into a form which is substantially horseshoe shaped so as to extend about the inner races 16 and the major portion of the drum 11. As illustrated in Figure 2, there are three sets of the outer races 22, 23 disposed at different elevations to cooperate with the three sets of inner races 16. The outer races 22, 23 are spaced outwardly from the inner races 16 to receive uprights or standards 24, 25 and 26 which constitute parts of a frame and are erected on a base 27. At their inner sides, the uprights are welded to outer edge portions of the inner races 16, such welds being indicated at 28. To the outersides of the uprights 24, 25 and 26 are welded angle irons 29, also welded to the outer races 22, 23.

An annular rotary table 30 is supported by the base 27 in position below the spaces between the knife 10 and the resilient members 19.

The table 30 is supported for movement on rollers 31 mounted upon a base ring 32 supported on the base 27. Annular grooves 33 and 34 in the table 30 and base ring 32 provide for confining the rollers 31 against radial displacement.

In the base 27 is a base chamber 35.

As shown more particularly in Figure 1, guides 36 and 37 are provided at the entrance of the unit and similar guides 38, 39 are provided at the exit end of the unit.

The cane stalks are indicated at 40.

In operation, the sugar cane stalks, after being cut at ground level and topped, are fed into the entrance end E and pass in the direction of the arrow A between the pairs of guides 36 and 37, these guides being bent, as shown in Figure 1, to provide flaring mouths E for the easy introduction of the stalks into throats and into the more constricted passages commencing approximately at the arrow A.

Upon reaching the position F, Figure 1, the sugar cane stalks contact the resilient members 19, and as the cane guideways, which are the spaces between the knife 10 and the resilient members 19, are narrower than the normal width of cane stalks, there will result a distortion of the rubber tubes 19, thereby setting up elastic stresses therein due to inherent resiliency which will react to force or urge the cane stalks against the edge of the helical knife 10. This contact is shown at G in Figure 2. The helical knife 10 revolves in the direction of the arrow C in Figure 1 which causes the same to travel down the stalks of cane as seen in Figure 2. This knife edge, being properly conditioned, usually by a slight knurling, thus rips off the leaves from the stalks of cane.

At the same time the stalks are caused to rotate around their own axes, as shown by the arrow H in Figure 1, not only by the action of rotation of the helical knife thereagainst which tends to spin the stalks, but also by the pushes of the flights 18 which are moving with the chain around the drum in the direction of the arrows A and C.

The table 30 is freely revoluble and the weight of the stalks resting thereon will tend to move the table around with the stalks so that the passage of the stalks 40 around in a closed part-circular path about the helical knife 10 is eased and the stalks therefore tend to remain upright with their axes substantially parallel with the upright axis of the drum.

The stalks are thus completely de-trashed as the same continue to move about the drum and be scraped by the helical knife as the stalks travel in the circular annular space between the edge of the helical knife and the surfaces of the rubber tubes until the same reach the point J, whereupon the guides 38, 39 take over and move the cane outwardly in the direction of the arrow B to the exit M, where the defoliated stalks may be picked up for delivery by any suitable means.

The leaves and trash removed from the cane are carried into the base chamber 35 by the screw action of the knife 10. The trash may be removed from the chamber 35 in any suitable manner.

The cane is propelled around the knife by the flights 18 which are suitably spaced along the length of the chains to receive the stalks therebetween.

The process also includes the step of elastically stressing the cane stalks while undergoing a stripping operation.

Although I have disclosed herein the best form of the invention known to me at this time, I reserve the right to all such modifications and changes as may come within the scope of the following claims.

What is claimed is:

1. A machine for stripping the leaves from sugar cane and the like comprising a helical knife mounted for rotation about an upright axis, means for rotating the helical knife, an at least part-circular conveyer race extending in spaced relation about the knife, a resilient deformable member on the race projecting inwardly of the race toward the knife for yieldingly pressing the stalks moving between the knife and said member against the knife, and a conveyer moving about the race and having flights positioned to engage the cane and advance the cane through the space between the knife and member.

2. A machine for stripping the leaves from sugar cane comprising a rotary helical stripping knife on an upright axis, means for presenting the cane stalks against the knife with the axes of the stalks substantially parallel to the axis of the rotary knife, and a rotatable table for engagement by ends of the stalks for holding the stalks substantially endwise immovable while the helical knife moves in the direction of the table.

3. A machine for stripping the leaves from sugar cane comprising a helical stripping knife on an upright axis, means for rotating the knife, a freely rotatable table around the lower portion of the knife for supporting cane stalks by their butt ends with their axes upright and substantially parallel to the axis of the helical knife, means for translationally moving the stalks and incidentally the table in a curvilinear path around the knife, and elastic means for yieldably pressing the stalks against the knife throughout the path.

References Cited in the file of this patent
UNITED STATES PATENTS

| | | |
|---|---|---|
| 736,278 | Lombard et al. | Aug. 11, 1903 |
| 1,009,233 | Gerdes | Nov. 21, 1911 |
| 1,741,602 | Athey | Dec. 31, 1929 |
| 2,481,462 | Woodland | Sept. 6, 1949 |
| 2,723,669 | Pool et al. | Nov. 15, 1955 |
| 2,834,994 | Strandine et al. | May 20, 1958 |
| 2,839,113 | Townsend | June 17, 1958 |